(12) United States Patent
Dawson

(10) Patent No.: US 6,567,099 B1
(45) Date of Patent: May 20, 2003

(54) METHOD AND SYSTEM FOR DYNAMICALLY ALLOCATING A FRAME BUFFER FOR EFFICIENT ANTI-ALIASING

(75) Inventor: Thomas Patrick Dawson, Escondido, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 121 days.

(21) Appl. No.: 09/713,070

(22) Filed: Nov. 15, 2000

(51) Int. Cl.[7] .......................... G06F 17/00; G06T 15/40
(52) U.S. Cl. ...................... 345/611; 345/422; 345/421; 345/531; 345/543; 345/545; 345/547
(58) Field of Search .................. 345/611, 612–614, 345/421, 422, 426, 428, 581, 589, 592, 597, 596, 530–531, 533, 535, 537–539, 541, 543, 545–547, 549, 556, 557, 562, 564, 418–420, 582, 583, 587, 618, 506

(56) References Cited

U.S. PATENT DOCUMENTS

| | | | |
|---|---|---|---|
| 5,815,166 A | * 9/1998 | Baldwin ...................... 345/506 |
| 5,880,737 A | * 3/1999 | Griffin et al. ................ 345/582 |
| 5,977,987 A | * 11/1999 | Duluk, Jr. .................... 345/441 |
| 5,995,121 A | * 11/1999 | Alcorn et al. ................ 345/520 |
| 5,999,189 A | * 12/1999 | Kajiya et al. ................ 345/582 |
| 6,005,580 A | * 12/1999 | Donovan ...................... 345/428 |
| 6,008,820 A | * 12/1999 | Chauvin et al. ............. 345/502 |

OTHER PUBLICATIONS

Command Sequencing for an Advanced Microcoded Rasterizer, IBM Technical Disclosure Bulletin, Sep. 1, 1993, US, vol. 36, Issue 9A, pp. 473–476.*

* cited by examiner

Primary Examiner—Matthew C. Bella
Assistant Examiner—Wesner Sajous
(74) Attorney, Agent, or Firm—Steven L. Nichols; Rader, Fishman, & Grauer PLLC

(57) ABSTRACT

An anti-aliasing system provides anti-aliasing at the edges of objects in a displayed or printed image without video artifacts or the need for an expensive anti-aliasing buffer. As geometric data is rasterized, the rasterizer identifies pixels on the edge of objects in the image being rendered. These pixels are then rendered at a higher resolution with a number of sub-pixels. The Z-buffer is signaled as to which pixels will require the additional, higher resolution data. The Z-buffer then dynamically allocates memory space in an additional memory unit to hold that additional sub-pixel data. A memory offset or address is provided in the Z-buffer to direct the memory controller to the appropriate address in the additional memory unit when the data in the additional memory unit is being blended to produce the data defining the corresponding main pixel which data is then stored in the Z-buffer.

24 Claims, 4 Drawing Sheets

| Bit Flags | Color Data | Z-Distance |
|---|---|---|
| 00 | color triplet | Z-distance |
| 11 | color triplet | memory offset value |
| 10 | color triplet | Z-distance |
| 10 | color triplet | Z-distance |
| 10 | color triplet | Z-distance |
| 10 | color triplet | Z-distance |
| 11 | color triplet | memory offset value |
| 11 | color triplet | memory offset value |
| 00 | color triplet | Z-distance |

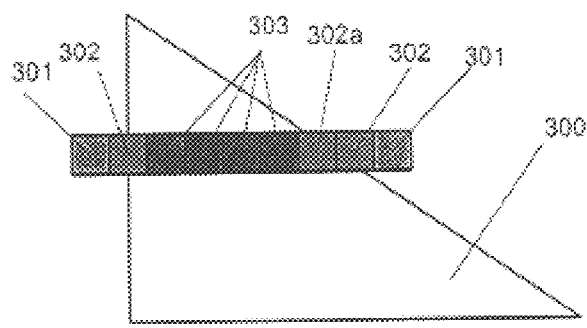
Fig. 4
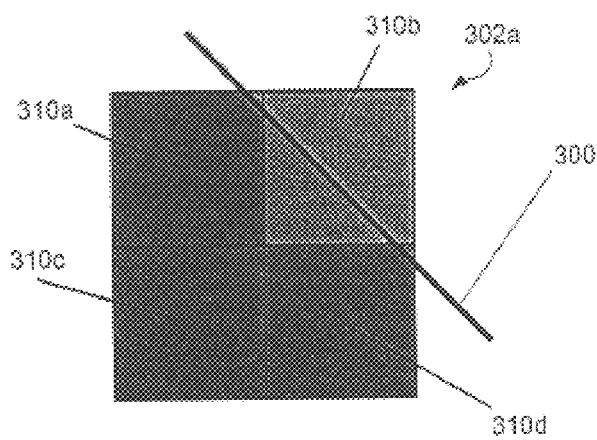
Fig. 4a
| Bit Flag | Color Data | Z-Distance |
|---|---|---|
| 1 | color triplet | Z-distance |
| 0 | data ignored | data ignored |
| 1 | color triplet | Z-distance |
| 1 | color triplet | Z-distance |
| 1 | color triplet | Z-distance |
| 0 | data ignored | data ignored |
| 1 | color triplet | Z-distance |
| 1 | color triplet | Z-distance |
Fig. 4b

METHOD AND SYSTEM FOR DYNAMICALLY ALLOCATING A FRAME BUFFER FOR EFFICIENT ANTI-ALIASING

FIELD OF THE INVENTION

The present invention relates to the field of anti-aliasing at the edges of an electronically displayed object. More particularly, the present invention relates to a method and system for dynamically allocating memory in a frame buffer to provide for additional memory to store higher resolution pixel data at the edge of an electronically displayed object to provide efficient anti-aliasing.

BACKGROUND OF THE INVENTION

Electronic display devices, such as computer monitors and television sets, display images, objects and scenes which are made up of a large number of pixels. Pixels are rectangular dots arranged in an array on the screen of the display monitor. In a color display, each pixel is defined by a particular color. The color of the pixel is usually specified as a color triplet, i.e. three numbers representing a red, green and blue component of the pixel's color. When properly arranged and viewed as a whole, the pixels form the image, object or scene being displayed. A printed image may also be formed of pixels.

Because pixels have a rectangular shape, it can be difficult to represent a diagonal or curved edge of an object without giving that edge a stair-stepped or jagged appearance. Anti-aliasing is term that describes a variety of techniques which are used to smooth the appearance of a diagonal or curved edge which must be rendered on a print medium or on an electronic display using rectangular pixels.

The basic idea behind anti-aliasing involves altering the pixels along such a curved or diagonal edge to a color between that of the color inside and outside the edge. The edge thus appears much smoother that would be the case otherwise. An example of this type of anti-aliasing is provided by black text characters (which have diagonal and curved edges) on a white background. Without anti-aliasing, diagonal edges appear jagged, like staircases, which may be noticeable, particularly on a low resolution display.

However, if the display can show intermediate shades of gray, then anti-aliasing can be applied. For example, a pixel will be black if it is completely within one of the text characters, white if its completely within the background, or an intermediate shade of gray according to the proportions of the pixel which overlap the black and white areas. The same technique works similarly with other foreground and background colors.

A common implementation of anti-aliasing involves electronically rendering the entire image at a resolution higher than that of the final output provided to the display monitor. A weighted resampling is then performed on the image data to blend the edges of the image. The resampling reduces the resolution to that specified for output to the display monitor.

While providing an anti-aliasing effect, this technique is, however, inefficient. For example, all parts of the image are subject to the anti-aliasing process, when anti-aliasing need only be performed on the diagonal or curved edges within the image. This technique also increases the time required to render an image because the entire image must be created at a higher resolution and then redacted for output. Additional cost is incurred to supply the extra memory required to hold the higher resolution image data during processing.

Another anti-aliasing technique adds extra information for each pixel within the displayed image. This additional information includes a flag for each pixel situated on an edge of an object within the displayed image and specifies a sub-pixel geometry for the object or objects of which that pixel is a part.

While, this technique provides an anti-aliasing effect, it is still highly inefficient. For example, in order to accommodate the extra information that may be associated with any pixel, the system's data buffer, called a Z-buffer, must be greatly expanded into an anti-aliasing buffer or A-buffer.

A traditional prior art Z-buffer is a fixed set of memory where there is a color, some number of control flags and a Z-distance value kept for every pixel location on the display screen. When data defining a particular fragment of a polygon arrives from the rendering engine (e.g., rasterizer, texture unit et al) it has a specific pixel location it is assigned to that is correlated to a specific memory location in the Z-buffer. If that location does not yet have a fragment assigned then the incoming data is placed in the Z-buffer at that location. In the case where data for a fragment associated with a particular pixel is received in the Z-buffer and data for another fragment associated with that same pixel has already been stored in the Z-buffer, then the Z values of the incoming fragment and the current location contents are compared. If the incoming fragment has a Z distance that is greater than the current entry in the Z-buffer, the incoming data is discarded or ignored. If the incoming fragment has a smaller Z-distance, the data of the incoming fragment replaces the current Z-buffer entry for that pixel. The result for equal Z values is usually controllable through a register setting.

A Z-buffer may also support partial transparency in the displayed image by applying rules that define how an incoming fragment may or may not be blended with the current Z-buffer contents. If the Z-buffer supports partial transparency then there is an extra bit and a transparency level value added to each fragment and each Z-buffer location to indicate whether transparency is being applied and what the blending level is.

The difference between an A-buffer and a Z-buffer is that an A-buffer keeps stacks of fragment data at edge locations and a Z-buffer does not. Regardless of the number of edge fragments applied, the "depth" of the Z buffer at a particular location does not change. In contrast, an A-buffer provides enough memory space for the data of each pixel to accommodate all the data described above. If that pixel is situated on an edge within the displayed image, it has additional Z-distance and sub-pixel geometry information for each underlying polygon fragment(s). In an A-buffer, each edge pixel location may have an entire stack of polygonal fragments associated therewith, for which data must be stored.

Some implementations of A-buffers do not perform an entire sub-sampling of the sub-pixel geometry and seams may occur. In such implementations, it may be necessary to draw all the objects on the display monitor twice in an attempt to eliminate these seams. This frequently results in visual artifacts on the screen, i.e., ghost images that are not intended as part of the displayed image. A high-quality A-buffer can eliminate these problems with visual artifacts, but incurs the cost of maintaining the exact sub-pixel geometry for each fragment of the objects being displayed. Such a high-quality A-buffer, and the complexity of the control mechanisms required to operate it, add excessively to the expense of the system.

Consequently, there is a need in the art for an improved system and method of anti-aliasing the edges within an electronically displayed image such that the edges are visually smoothed, but the anti-aliasing system is not unduly slow or prohibitively expensive.

SUMMARY OF THE INVENTION

The present invention meets the above-described needs and others. Specifically, the present invention provides a system in which additional memory is annexed as needed by the Z-buffer of an anti-aliasing system in an image display or printing system so that pixels at the edge of an element in the image can be rendered at a higher resolution. The additional memory is used to store the extra data required for those higher resolution pixels which are situated at the edges of the image elements being displayed or printed. With higher resolution pixels provided at the edges of the image elements, anti-aliasing is accomplished without video artifacts or the need for an expensive and complex anti-aliasing buffer (i.e., an A-buffer).

Additional advantages and novel features of the invention will be set forth in the description which follows or may be learned by those skilled in the art through reading these materials or practicing the invention. The advantages of the invention may be achieved through the means recited in the attached claims.

In summary, the present invention may be embodied and described as an anti-aliasing system composed of a polygon rendering system receiving geometric data for an image being rendered, and a main buffer with an additional memory unit controlled by a memory controller for buffering image data as output by the polygon rendering system. The polygon rendering system includes a rasterizer unit that processes the geometric data. When the rasterizer unit processes the geometric data for a pixel located on an edge of an object in the image, the rasterizer signals the memory controller. The memory controller then allocates a portion of the additional memory unit to contain additional pixel data for that edge pixel such that higher resolution is provided in the rendered image along edges of the object.

Preferably, the rasterizer unit includes a bit flag cache with a memory location to store a bit flag corresponding to each pixel in the image. The rasterizer then stores a hi-res bit flag value in the bit flag cache for each pixel in the image. The hi-res bit flag indicates whether that pixel is an edge pixel for which a portion of the additional memory unit is allocated.

Preferably, the memory controller includes an additional memory offset register which is incremented by a predetermined value to provide an offset value when a portion of the additional memory unit is allocated. This offset value provides an address to the additional memory unit where the additional pixel data will be stored.

The main buffer preferably contains at least three data fields for each pixel in the image, (1) a bit flag field, (2) a color data field and (3) a Z-distance field. For a pixel which is an edge pixel, i.e. for which the hi-res bit flag is "on," and for which a portion of the additional memory unit is allocated, the memory controller writes the offset value from the offset register in the Z-distance field. That offset value then indicates an address in the additional memory unit corresponding to that pixel.

The additional memory unit stores a cluster of sub-pixel data for each edge pixel in the image. The sub-pixel data includes data specifying the characteristics of each of a number of sub-pixels the data for which is used collectively to represent the corresponding edge pixel in the rendered image. Preferably, the number of sub-pixels equals four. The cluster of sub-pixel data usually includes color and Z-distance data for each of the sub-pixels.

In a first embodiment of the present invention, the image data stored in the main buffer is output to a video signal generator connected to a display monitor. In a second embodiment of the present invention, the image data stored in the main buffer is output to a printer.

The present invention also encompasses the method of manufacturing and operating the anti-aliasing system described above. For example, the present invention encompasses a method of anti-aliasing edges in an image rendered from electronic geometric data by dynamically allocating additional memory space in an additional memory unit, which is in addition to memory space allocated in the main buffer, for data defining the characteristics of a pixel on an edge of an object in the image being rendered, such that the edge can be rendered at a higher resolution than other portions of the image to provide anti-aliasing.

BRIEF DESCRIPTION OF THE DRAWINGS

The accompanying drawings illustrate the present invention and are a part of the specification. Together with the following description, the drawings demonstrate and explain the principles of the present invention.

FIG. 4 is a diagram of a polygon and pixels being processed and displayed according to the principles of the present invention.

FIG. 4a is a diagram of a pixel containing sub-pixels according to the present invention.

FIG. 4b is a chart illustrating the data fields in a segment of the additional memory unit of the present invention.

DETAILED DESCRIPTION OF THE PREFERRED EMBODIMENTS

The present invention provides a system in which additional memory is annexed as needed by the Z-buffer of an anti-aliasing system in an image display or printing system so that pixels at the edge of an element in the image can be rendered using a wealth of sub-pixel data. The additional memory is used to store the extra data required for those higher resolution pixels which are situated at the edges of the image elements being displayed or printed. With higher resolution pixels provided at the edges of the image elements, anti-aliasing is accomplished without video artifacts or the need for an expensive and complex anti-aliasing buffer (i.e., an A-buffer).

In an image display or printing system, particularly where the image is generated or processed using a computer, the image may be represented in the memory of the computer as a number of geometric data, i.e., polygonal shapes or frameworks to which particular textures are then applied to complete the image as the image is displayed or printed. Consequently, as the geometric data is retrieved or generated by the computer, it must be processed through a geometric data processing system that interprets the polygonal and texture data to render the completed image. Such a system, according to the principles of the present invention, is illustrated in FIG. 1.

Figure 1:
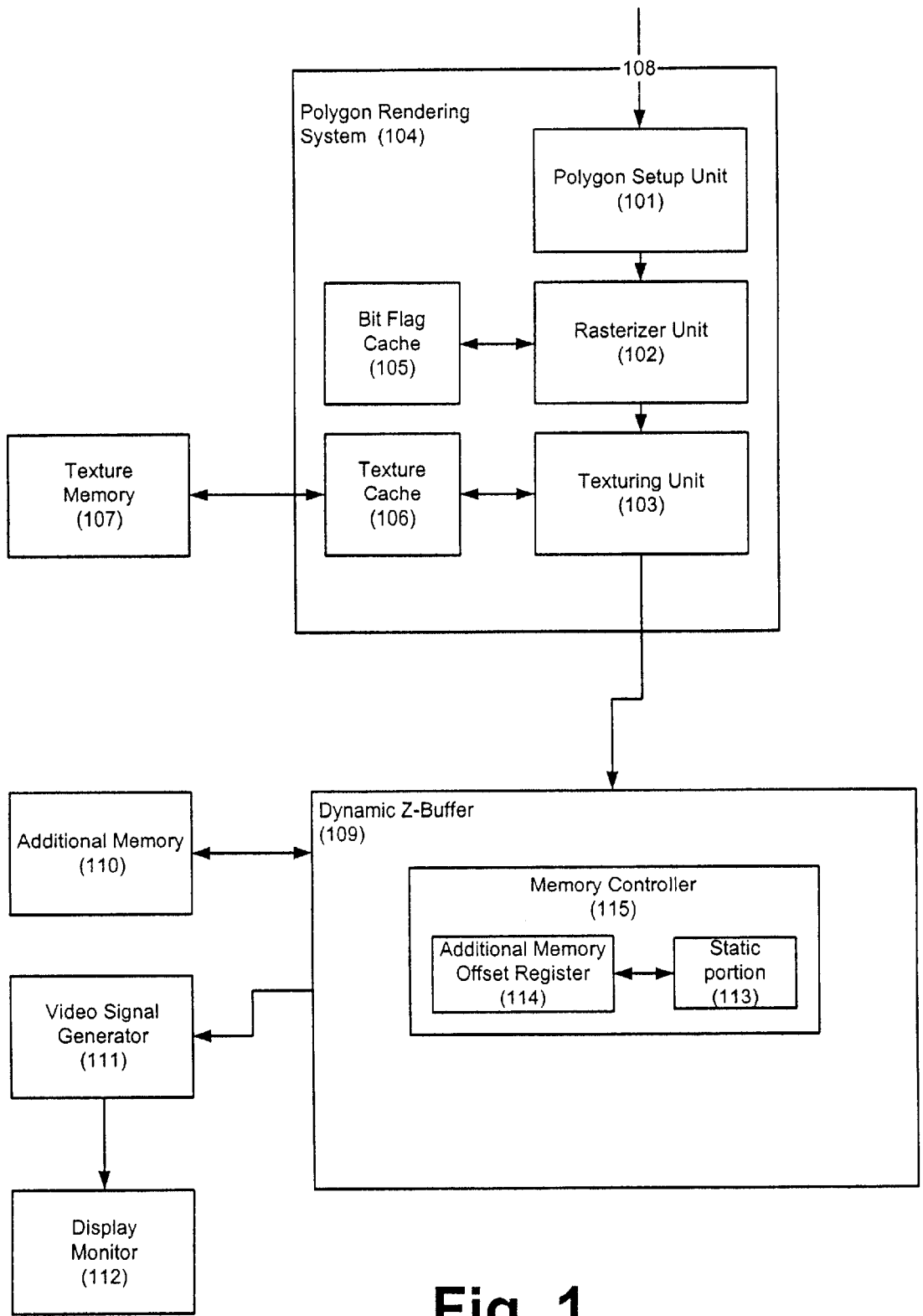
FIG. 1 is a block diagram illustrating the anti-aliasing system of the present invention implemented in an electronic display system.

FIG. 1 illustrates a portion of an image processing system associated with, for example, a display monitor (112). As will be understood by those skilled in the art, the elements of FIG. 1 include a combination of hard and software elements, where some of the elements can be embodied as either, or as firmware depending on the needs and design considerations of a particular implementation.

As shown in FIG. 1, the geometric and texture data (108) for the image to be rendered is received from a host computer or other system that has retrieved or generated the geometric data. This data is received by a polygon rendering system (104). The polygon rendering system (104) includes a polygon setup unit (101), a rasterizer unit (102) and a texturing unit (103).

The polygon setup unit (101), operating on principles known in the art, reformats the geometric data (109) into an input form required by the rasterizer unit (102). The texturing unit (103), also operating on principles known in the art, adds additional texture data to the polygonal shapes and textures specified in the geometric data signal (108). The texturing unit (103) operates by reading texels (bits of texture data) from the appropriate textures for a particular frame of video or a particular image from a texture cache (106) or from a texture database or memory (107).

After the geometric data has been formatted for the rasterizer unit (102), and before any additional textures are added by the texturing unit, the geometric data must be rasterized by the rasterizing unit (102). The rasterizer unit (102) processes the geometric data to divide the data into polygon fragments and identify one or more polygon fragments associated with each pixel in the image being rendered.

After the geometric data has been rasterized and textured, it is output to a buffer (109) which then feeds the data to a video signal generator (111). The video signal generator (111) then uses the data to generate a video signal which is output to the display monitor (112). The display monitor (112) uses that video signal to render the desired image on the display screen of the monitor (112). All output to a display screen or printer is in raster format.

Under the principles of the present invention, the rendering system (104) and buffer (109) are used to anti-alias the edges of the elements in the image before the data is output to the video signal generator (111). This is accomplished as follows.

The rasterizer unit (102) includes a bit cache (105) that holds a single bit that corresponds to each pixel on the screen of the display monitor (112). Before each image or scene is rendered (i.e., displayed on the monitor (112) or printed by printer (201)), the bit cache (105) is initialized to contain a zero ("0") value at each bit location. During the rasterization process performed by the rasterizer (102), the rasterizer (102) will identify those pixels which are located on the edge of a polygonal shape as output by the polygon setup unit (101).

The detection of an edge pixel by the rasterizer (102) causes the rasterizer (102) to write a one ("1") to the pixel location in the bit cache (105) corresponding to that edge pixel. If the current bit cache value at that location is already "1," nothing else need happen. For each edge pixel, the rasterizer (102) will generate additional data on the sub-pixel geometry of the polygon fragments at that location in the image being rendered. As will be described in more detail below, this preferably includes generating data for four sub-pixels, the data for which, is used to render the corresponding edge pixel.

The results of the rasterization process and the contents of the bit flag cache (105) are communicated to the Z-buffer (109). The bit flag from the bit flag cache (105) will be referred to hereafter as the "hi-res bit flag" and is one of at least three data items communicated to the Z-buffer by the polygon rendering system (104). Specifically, the hi-res bit flag for each pixel, and geometric data describing a polygon fragment at that pixel location in the image being rendered are sent to the Z-buffer (109) from the polygon rendering system (104).

When pixel data including the hi-res bit flag is communicated to the Z-buffer, a memory controller (115) detects the value of the hi-res bit flag. If the hi-res bit flag is set to "0," the memory controller (115) stores the pixel data in an appropriate portion of the Z-buffer (109). If the memory controller (115) receives pixel data including a hi-res bit flag set to "1," the memory controller (115) allocates additional memory in the additional memory unit (110) to store the expanded higher-resolution data associated with that pixel. The additional memory unit (110) may be a separate memory unit or a designated portion of the Z-buffer structure.

After an image has been rendered, the polygon rendering system (104) may output a command to the Z-buffer (109) to clear allocated memory (110) and reset the memory controller (115). Other command types between the rendering system (104) and the buffer (109) may be included as need to implement additional features.

A standard Z-buffer will have a certain amount of memory set aside to store data for each pixel in the image as output by the polygon rendering system (104). This data includes a color triplet, a Z-distance value and, possibly, some bit flags stored for each pixel location. The color triplet specifies the color for that pixel using three numbers, a red, green and blue value. The Z-distance value specifies the distance of the polygon fragment(s) associated with that pixel from the view plane. The bit flags typically hold information about the current status of the pixel location.

As described above, under the principles of the present invention, the high-res bit flag is added to each pixel location. If the hi-res flag is on, i.e., the value of the hi-res bit flag is "1," then the portion of the Z-buffer memory normally used to hold the Z-distance value for that pixel is instead used to provide an offset to an address in the additional memory unit (110) where the higher-resolution data for that edge pixel is stored. This offset data is determined by the memory controller (115) as locations in the additional memory unit (110) are allocated. The memory controller (115) then writes the offset data to the Z-distance field in each pixel data set for which additional memory is allocated.

As noted above, the additional memory unit (110) is added to hold extra data for the edge pixels, i.e. a pixel for which the hi-res flag is "1," so that those pixels can be rendered at a higher resolution. For example, each edge pixel is preferably divided into four sub-pixels, each of which is specified using the same data required to specify the attributes of a full pixel, e.g., a color triplet. The four sub-pixels are arranged as a rectangular, 2×2 matrix. The data of the sub-pixels is used to generate composite data defining the corresponding edge pixel. In other words, the sub-pixels are blended to produce an edge pixel.

Figures 3, 3A:
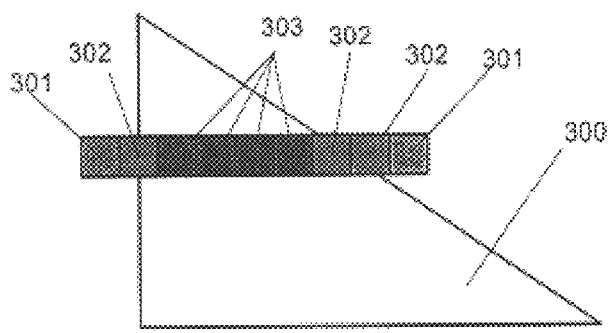
FIG. 3 is a diagram of a polygon and pixels being processed and displayed according to the principles of the present invention.
FIG. 3a is a chart illustrating the data fields in a segment of the dynamic Z-buffer of the present invention.

FIG. 3 illustrates a representative polygon (300) with a row of pixels which have been generated across that polygon. As shown in FIG. 3, there are three basic types of pixels. First, there are pixels (301) which are outside the polygon (300) and which are used to represent the background of the image. Second, there are pixels (303) that are wholly within the polygon (300) and are used to represent the color and texture of the polygon. Finally, there are pixels (302) that contain an edge of the polygon (300). These pixels (302) may require anti-aliasing in order to appropriately render the polygon (300).

FIG. 3a is a table (109) representing a portion of the Z-buffer as it is divided for containing individual pixel data. As shown in FIG. 3a, the Z-buffer preferably provides three data fields for each pixel. The first field contains the bit flag(s) associated with that pixel. The second field contains the color data in the form of a color triplet, and the third field contains the Z-distance data. The entries in the table (109), from top to bottom, correspond to the nine pixels (301–303) illustrated in FIG. 3, as viewed from left to right.

In the preferred embodiment illustrated in FIG. 3a, there is a two-bit flag used to determine if a pixel is a background pixel (301), a pixel within a polygon (303) or an edge pixel (302). The first bit indicates whether the pixel is part of a polygon or in the image background. The second bit in this two-bit flag is the hires bit flag, indicating an edge pixel.

Consequently, as illustrated in FIGS. 3 & 3a, a background pixel (301) is indicated by a "00" in the bit flag field. The second bit, the hi-res bit flag, is set to "0" because the background pixel (301) does not contain an edge of a polygon. The color data field for this pixel (301) contains a conventional color triplet, and the Z-distance field contains the expected Z-distance value. Because a background pixel cannot be a hi-res pixel, a bit flag value of "01" would be treated the same as "00."

The pixels (303) internal to the polygon (300) are indicated by a "10" in the bit flag field. The second bit, the hi-res bit flag, is set to "0" because the internal pixels (301) do not contain an edge of the polygon (300). The color data field for these pixels (303) contains the expected color triplet, and the Z-distance field contains the expected Z-distance value.

In the Example of FIG. 3a, the edge pixels (302) are indicated by a bit flag field value of "11." The second bit, the hi-res bit flag is set to "1" because the pixel (302) does contain an edge of the polygon (300). For an edge pixel (302), the color triplet field will include a color triplet that is an average of the color triplet data for the sub-pixels corresponding to that pixel. The color triplets for the sub-pixels are stored in an allocated portion of the additional memory unit (110). The Z-distance field for the pixel (302) does not contain Z-distance data, but rather specifies the offset to, or address in, the additional memory unit (110) where the data is stored for the sub-pixels, the data which is used, e.g., blended, to produce the color triplet for the corresponding edge pixel (302).

FIG. 4 is substantially identical to FIG. 3. However, FIG. 4 specifies the location of a particular edge pixel (302a) on the right-hand edge of the polygon (300). This particular edge pixel (302a) will be used to further explain the principles of the present invention. The following explanation is an example of how sub-pixeling would be handled under a preferred embodiment of the present invention. Other approaches to sub-pixeling the edge pixel (302a), while not necessarily equivalent, would be within the scope of the present invention so long as the sub-pixel data is dynamically allocated to space in an additional memory unit.

FIG. 4a provides a more detailed illustration of the edge pixel (302a). The edge pixel (302a) is divided into four sub-pixels (310) which are arranged in a rectangular, 2×2 matrix. The data for the sub-pixels is averaged to produce the data defining the corresponding edge pixel (302a) in the rendered image.

As shown in FIG. 4a, the edge of the polygon (300) passes mostly through sub-pixel (310b). Sub-pixel (310c) is missed entirely by the edge (300), while the other sub-pixels (310a & 310d) are only grazed by the edge.

Under a preferred sub-pixel scheme, a sub-pixel will be treated as an internal pixel if the majority of that sub-pixel is within the polygon. A sub-pixel will be treated as a background pixel if the majority of that sub-pixel is outside the polygon. Consequently, sub-pixels (310a, 310c & 310d) will be treated as pixels internal to the polygon and will be rendered similarly to the pixels (303) described above. Sub-pixel (310b) will be considered outside the polygon (300) and will be rendered as a background pixel, similar to the pixels (301) described above. Alternatively, if another polygon is immediately adjacent to the polygon (300) and a majority of the area of sub-pixel (310b) falls within that second, adjacent polygon, then sub-pixel (310b) will be rendered as a pixel internal to that second, adjacent polygon.

FIG. 4b is a table (110) that illustrates the data fields and structure of the additional memory unit (110). The additional memory area (110) is preferably arranged as a simple linear array of sub-pixel clusters. Each sub-pixel cluster holds some number of color triplets, Z-distance values and sets of bit flags for the sub-pixels that correspond to a particular edge pixel. The basic idea is to replicate the format of the Z-buffer information N times, wherein N is some power of 2 and corresponds to the number of sub-pixels replacing a main pixel.

In the preferred example described herein, N=4. In other words, there are four sub-pixels providing data for each edge pixel to provide anti-aliased edge pixels along the edges of objects in the image or scene being rendered. Consequently, there are four entries in a sub-pixel cluster (302a), as illustrated in FIG. 4b.

The first entry corresponds to the sub-pixel (310a). In the preferred embodiment, the entry includes a bit flag which is set to "1." This bit flag is used to indicate whether the data for that sub-pixel should be used in the average that results in the data defining the main pixel (302a). Where the bit flag is on, i.e., set to the value "1," the color triplet data for that sub-pixel will be used by the memory controller (115) to generate an averaged color triplet that is recorded in the "Color Data" field of the Z-buffer for the corresponding main pixel.

The next entry is for the sub-pixel (310b). In this case, the bit flag is set to "0." This signals to the memory controller (15) that the data for the sub-pixel is to be ignored when generating an averaged color triplet that is recorded in the "Color Data" field of the Z-buffer for the corresponding main pixel.

When all the data for the sub-pixels (310) has been written to the additional memory (110), the memory controller (115) will average the color data for each sub-pixel group (302a, FIG. 4b). The resulting, "blended" average is written to the Z-buffer as the color triplet for the corresponding pixel (e.g., 302; FIG. 3a). In this way, anti-aliasing is effected.

When the contents of the Z-buffer (109) are output, only the color triplet data for each pixel is output, sequentially, to the video signal generator (111). Thus, the dynamic Z-buffer (109) of the present invention appears to the output circuitry (e.g., 111) like any conventional Z-buffer. Moreover, the Z-buffer (109) can be of a typical size and complexity for storing pixel data. For an edge pixel where higher resolution and, therefore, more sub-pixel data, is required, the Z-buffer dynamically allocates memory space in the additional memory unit (110) to contain that data. The higher-resolution sub-pixel data is then output to the video signal generator (111) or other data recipient device appropriately to provide a higher-resolution image around the edges of the object in the image or scene being rendered. Consequently, anti-aliasing is accomplished without expensive components or video artifacts.

The memory controller (115) preferably includes an address register (114) that is incremented by the size of a sub-pixel cluster whenever a new memory location is to be allocated in the additional memory unit (110). The current offset value may be stored in a static portion (113) of the Z-buffer (109). When a new memory location is to be allocated in the additional memory unit (110), the controller (115) retrieves the current offset value from the static portion (113), increments that value by the size of a sub-pixel cluster with the register (114) and outputs the result as the offset value corresponding to the allocated memory location for the next sub-pixel cluster to be stored.

After a frame of video or an image or scene has been rendered, the additional memory unit (110) is cleared by the memory controller (115). More specifically, the polygon rendering system (104) will transmit a reset command to the memory controller (115). The memory controller (115) may then reset all the bits in the additional memory unit (110) to "0." The memory controller (115) will also reset the current offset value used by the additional memory offset register (114) and stored in the static memory (113) to "0."

Figure 2:
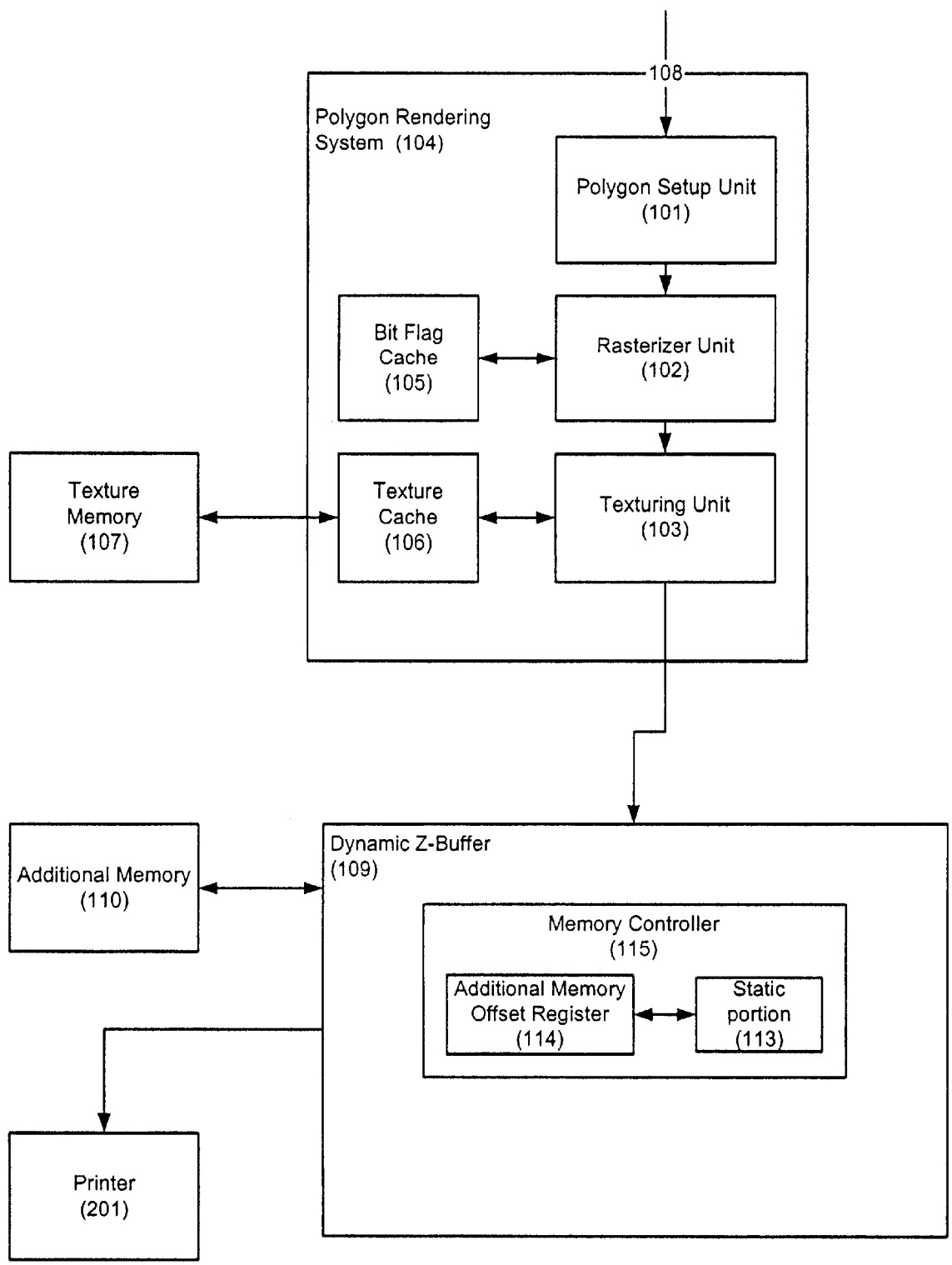
FIG. 2 is a block diagram illustrating the anti-aliasing system of the present invention implemented in an image printing system.

FIG. 2 is an illustration of a second embodiment of the present invention. The embodiment of FIG. 2 is substantially similar to the embodiment of FIG. 1. Identical elements are indicated with identical reference numbers. Therefore, a redundant explanation of elements already discussed will be omitted.

As shown in FIG. 2, the anti-aliasing system of the present invention can be applied to an image printing system as well as to an electronic image display system. The anti-aliasing system of the present invention is illustrated in FIG. 2. However, the output of the Z-buffer (109) is provided to a printer (201) instead of to a display monitor as in FIG. 1. This can provide high-quality anti-aliasing within the printed image with all the advantages described above.

As used herein, the term "printer" is used to refer generally to a class of devices that use geometric data to render the corresponding image on a print medium, such as paper. Consequently, "printer" includes, but is not limited to, laser printers, inkjet printers, digital copiers, facsimile machines, dot-matrix printers, plotters and the like.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An anti-aliasing system comprising:
   a polygon rendering system receiving geometric data for an image being rendered, said polygon rendering system comprising a rasterizer unit; and
   a main buffer for pixel data output by said rasterizer unit with an additional memory unit controlled by a memory controller;
   wherein,
   when said rasterizer unit processes geometric data for a pixel located on an edge of an object in said image, said rasterizer unit signals said memory controller; and said memory controller allocates a portion of said additional memory unit to contain additional data for that edge pixel.

2. The system of claim 1, wherein:
   said rasterizer unit comprises a bit flag cache having a memory location to store a bit flag corresponding to each pixel in said image; and
   said rasterizer stores a hi-res bit flag value in said bit flag cache for each pixel in said image, said hi-res bit flag indicating whether that pixel is an edge pixel for which a portion of said additional memory unit is allocated.

3. The system of claim 1, wherein said memory controller comprises an additional memory offset register which is incremented by a predetermined value to provide an offset value when a portion of said additional memory unit is allocated.

4. The system of claim 3, wherein:
   said main buffer contains at least three data fields for each pixel in said image;
   said three data fields are a bit flag field, a color data field and a Z-distance field; and
   for a pixel which is an edge pixel and for which a portion of said additional memory unit is allocated, said memory controller writes an offset value indicating an address in said additional memory unit in the Z-distance field corresponding to that pixel.

5. The system of claim 1, wherein said additional memory unit stores a cluster of sub-pixel data for each edge pixel in said image, said sub-pixel data comprising data specifying characteristics of each of a number of sub-pixels which sub-pixel data is used to generate data defining a corresponding edge pixel in said rendered image.

6. The system of claim 5, wherein said cluster of sub-pixel data comprises color and Z-distance data for said sub-pixels.

7. The system of claim 5, wherein:
   each sub-pixel, a majority of which is located within a polygonal shape in said image, is rendered as a pixel wholly internal to said polygonal shape; and
   each sub-pixel, a majority of which is located outside of a polygonal shape in said image, is rendered as a background pixel.

8. The system of claim 5, wherein said number of sub-pixels which is four.

9. The system of claim 1, wherein said data stored in said main buffer is output to a video signal generator connected to a display monitor.

10. The system of claim 1, wherein said geometric data stored in said main buffer is output to a printer.

11. A method of anti-aliasing edges in an image rendered from electronic geometric data, the method comprising dynamically allocating additional memory space in an additional memory unit, which is in addition to memory space allocated in a main buffer, for data defining characteristics of a pixel on an edge of an object in said image being rendered.

12. The method of claim 11, further comprising rasterizing geometric data with a rasterizer unit to identify edge pixels, said rasterizer unit signaling a memory controller when said rasterizer unit processes geometric data for an edge pixel.

13. The method of claim 12, wherein said memory controller allocates said additional memory space in response to commands from said rasterizer unit.

14. The method of claim 13, further comprising storing a hi-res bit flag value in a bit flag cache with said rasterizer unit for each pixel in said image, said hi-res bit flag indicating whether that pixel is an edge pixel for which said additional memory space is allocated.

15. The method of claim 12, further comprising tracking allocations of memory space in said additional memory unit with a memory offset register which is incremented by a predetermined value to provide an offset value when a memory space in said additional memory unit is allocated.

16. The method of claim 15, further comprising, when additional memory space is allocated, writing an offset value addressing that allocated memory space to a data field in said main buffer that is part of a data set corresponding to an edge pixel, wherein said offset value is output by said offset register.

17. The method of claim 16, wherein said data field is a Z-distance data field.

18. The method of claim 11, further comprising storing a cluster of sub-pixel data in the allocated memory space of said additional memory unit for each edge pixel in said image, said sub-pixel data comprising data specifying characteristics of each of a number of sub-pixels.

19. The method of claim 18, further comprising averaging color data for a group of said sub-pixels to generate a color data value for a main pixel corresponding to said group of sub-pixels.

20. The method of claim 11, further comprising outputting said data stored in said main buffer to a video signal generator connected to a display monitor.

21. The method of claim 11, further comprising outputting said data stored in said main buffer to a printer.

22. A system for anti-aliasing edges of objects in an image rendered from electronic geometric data, said system comprising:

means for processing said geometric data to generate pixel data; and means for dynamically allocating additional memory space in an additional memory unit, which is in addition to memory space allocated in a main buffer, for pixel data defining characteristics of a pixel on an edge of an object in said image being rendered.

23. The system of claim 22, wherein said means for processing geometric data further comprise rasterizing means that generate said pixel data and identify edge pixels, said rasterizing means signaling a memory control means when said rasterizing means processes geometric data for an edge pixel.

24. The system of claim 23, wherein said memory control means allocates said additional memory space in response to commands from said rasterizing means.

* * * * *

UNITED STATES PATENT AND TRADEMARK OFFICE
CERTIFICATE OF CORRECTION

PATENT NO.    : 6,567,099 B1
DATED         : May 20, 2003
INVENTOR(S)   : Thomas Patrick Dawson It is certified that error appears in the above-identified patent and that said Letters Patent is hereby corrected as shown below:

Column 10,
Line 11, change "a pixel located" to -- an edge pixel located --.

Signed and Sealed this

Nineteenth Day of August, 2003

JAMES E. ROGAN
*Director of the United States Patent and Trademark Office*